Jan. 28, 1958  V. V. UTGOFF  2,821,351
AIRPLANE WING STRUCTURE EMBODYING JET ENGINE
Filed Jan. 3, 1957
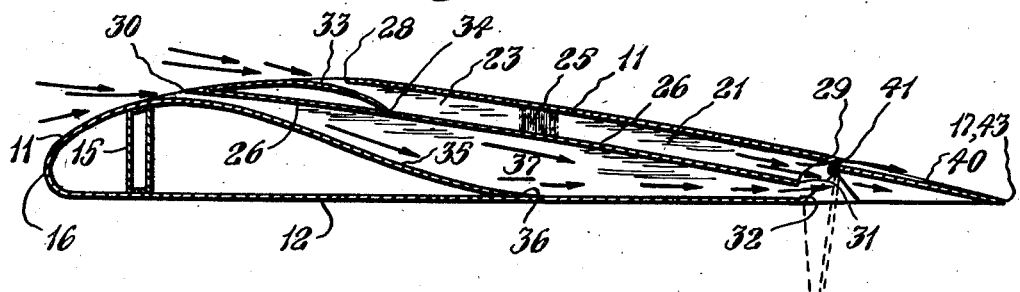
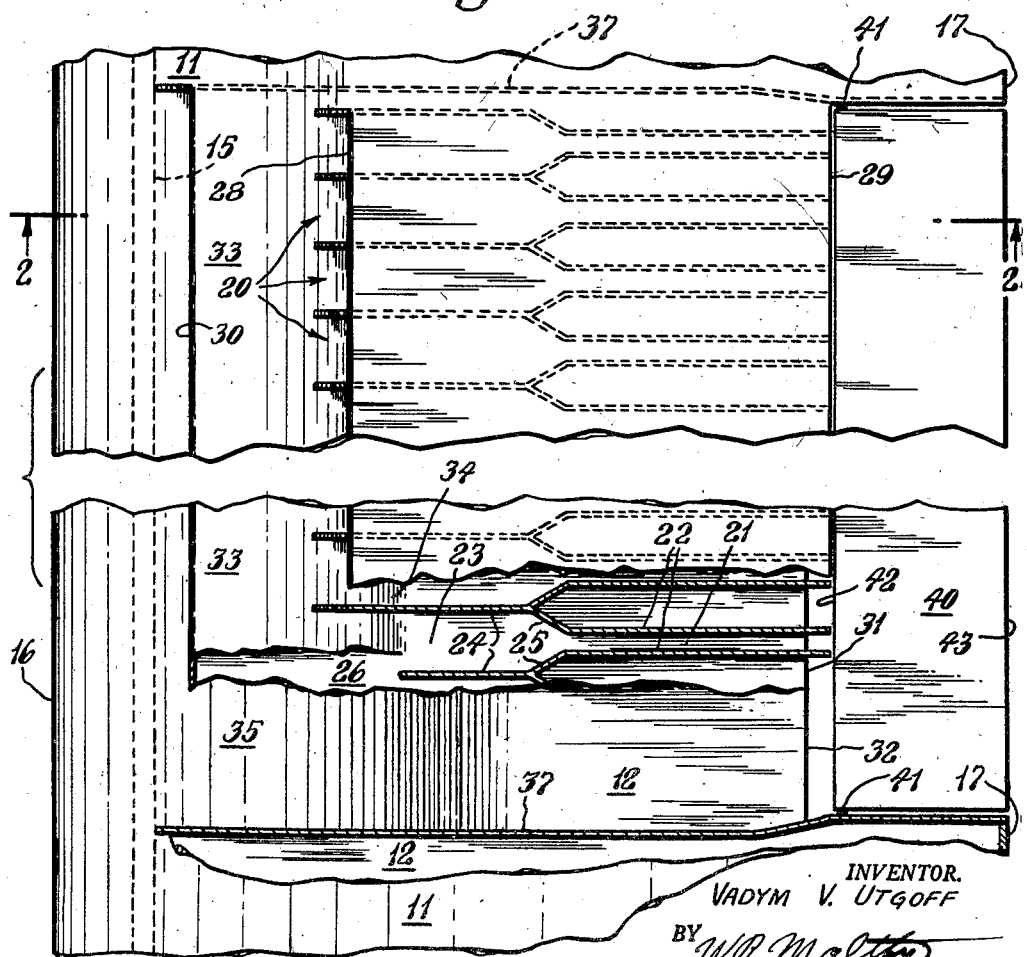
INVENTOR.
VADYM V. UTGOFF
BY
ATTORNEYS

2,821,351

AIRPLANE WING STRUCTURE EMBODYING JET ENGINE

Vadym V. Utgoff, Alexandria, Va.

Application January 3, 1957, Serial No. 632,401

2 Claims. (Cl. 244—15)

(Granted under Title 35, U. S. Code (1952), sec. 266)

The invention described herein may be manufactured and used by or for the Government of the United States of America for governmental purposes without the payment of any royalties thereon or therefor.

The present invention pertains to the art of aircraft which are propelled by one or more jet engines, and comprises wing structure which embodies a jet engine integrated with the wing structure.

The principles of the invention, and a practical embodiment thereof, are disclosed in the accompanying drawing and specification. In the drawing Fig. 1 is a fragmentary plan of a wing embodying structure of the present invention, showing parts broken away for clearness of illustration, and Fig. 2 is a cross-sectional elevation, taken on line 2—2 of Fig. 1.

Airplane wing structure embodying the invention comprises the usual top and bottom surface-skins, 11 and 12 respectively. In accordance with prior-art practice, a wing embodying the present invention may contain a spar 15, by means of which the wing is secured to the fuselage, not shown. Spar 15 supports the wing extended spanwise to the wing tip, not shown, and projecting laterally away from the fuselage in the usual manner. Leading edge 16 is curved, as shown in Fig. 2, and sweeps rearwardly at the top and bottom of the wing, merging smoothly into the contours of the top and bottom skin surfaces which are formed by top and bottom surface-skins 11 and 12. Rearwardly from leading edge 16, skins 11 and 12 extend to where they meet along trailing edge 17 in the usual manner, which constitutes a spanwise line along the length of the wing.

According to practice of the present invention, structure of the wing embodies one or more pulse-jet engines between the fuselage and the wing tip. An engine consists of a set of units 20 positioned inside the wing side-by-side in the direction spanwise thereof. Each unit 20 of itself constitutes a pulse-jet engine, and constitutes also a component of the whole engine, which consists of the set of units 20. The engine, consisting of the several units 20 of a set, is secured along the inside surface of top skin 11.

Each jet unit 20 is rectangular in cross-section, and thereby conserves space and material, enabling maximum power to be generated in a minimum of space, and requiring a minimum weight of material. Tail pipe 21 of each unit 20 is contained between opposite side walls 22, and extends continuously with combustion chamber 23 of the unit, the combustion chamber being of greater cross-sectional area than the tail pipe. Combustion chamber 23 also is contained between opposite side walls 24, corresponding respectively with side walls 22 of the tail pipe of the unit. In a unit 20, corresponding side walls 22 and 24 of the tail pipe and combustion chambers respectively are extended continuously of each other to include offset 25 between them, thereby establishing the desired ratio between cross-sectional areas of the tail pipe and combustion chamber in accordance with preferred jet-engine design practice.

Side walls 22, 24, 25 are formed of sheet metal or the like, secured to each other and contoured as seen in Fig. 1, and the side walls are secured continuously along one of opposite side edges to the inside surface of top skin 11 by any suitable means. Along the other of opposite side edges, side walls 22, 24, 25 are secured continuously to plate 26, which extends forwardly to contain combustion chamber 23, rearwardly to contain tail pipe 21, and spanwise to contain all the several units 20 of the engine. Each unit 20, in addition to being contained between opposite side walls 22, 24, 25, is contained between opposite top and bottom walls of surface-skin 11 at the top and plate 26 at the bottom. Each unit thereby is contained within four walls. Surface-skin 11 of the wing serves additionally as one of the containing walls of the engine, and affords thermal control of the engine by means of air that flows along the top surface of the wing operating as a coolant which inhibits deterioration of the engine material from excessive heat.

That area of top surface-skin 11 that constitutes the top walls of units 20 extends forwardly to spanwise edge 28, and rearwardly to spanwise edge 29. In the structure as disclosed, plate 26 extends forwardly to spanwise edge 30, which is located coincident with the wing contour of top surface-skin 11, and plate 26 extends rearwardly to spanwise edge 31 that is located proximately below and adjacent to rearward edge 29 of skin 11, positioned as seen in Fig. 2. Bottom surface-skin 12 extends rearwardly from leading edge 16 to spanwise edge 32, which also is proximately below and adjacent to rearward edges 29 and 31, as shown. In the spanwise direction, edge 32 continues throughout the spanwise extent of the several units 20 and beyond.

Contoured plate 33 meets and is secured to plate 26 continuously along its forward edge 30, and follows the contour of the top surface of the wing rearwardly therefrom towards edge 28. Where it nears edge 30, plate 33 curves smoothly into the wing towards plate 26, and meets plate 26 in smooth curvature, and is secured continuously thereto, along a spanwise line 34, which is located along plate 26 rearwardly from its forward edge 30. Where it approaches forward edge 28, plate 33 forms a spanwise air-intake slot in the top surface of the wing, and the plate extends rearwardly from the slot adjacent to the inside of the surface-skin 11 for a distance until it curves downwardly towards plate 26, thus forming a restricted throat for the intake of air into the several combustion chambers 23 of engine unit 20.

An aspirator is included in the wing structure of the disclosure. Extending rearwardly from a spanwise line along surface-skin 11 which is spaced away forwardly of edge 30 of plate 26, contoured plate 35 is curved smoothly into the wing to extend rearwardly and towards bottom skin 12, which it meets in smooth curvature as shown, and to which it is attached continuously, along spanwise line 36. An inlet slot in the top of the wing is formed between plate 35 and plate 26 to admit air into the space within the wing below plate 26. At the inlet slot, plate 35 is positioned adjacent to plate 26 for a distance as shown, to restrict the inlet slot. Both slots, the aspirator-inlet slot formed by spanwise edge 30, and the spanwise engine-intake slot formed by spanwise edge 28, are positioned in the top surface of the wing located rearwardly of leading edge 16, the engine-intake slot being positioned rearwardly of the aspirator-inlet slot.

The space formed by plate 35 below plate 26 is enclosed by opposite side walls 37, which are positioned both beyond the extent of the units 20 constituting the engine, as seen in Fig. 1. Each side wall 37 is a length of sheet metal or the like, which is secured along one of its opposite side edges continuously to the inside surface of top skin 11 from the slot of forward edge 30 to trailing edge 17, and along the other of its opposite side edges to the inside surface of skin 12 and to plate 35 continuously. Plate 35 and bottom skin 12 continuously therewith, with opposite side walls 37, constitute a container of the air inside the wing that is around the engine of the several units 20, and the container is open at its forward end for air to flow into the aspirator through the inlet slot that is formed between plate 35 and the forward edge 30 of plate 26, the slot being extended spanwise of the wing throughout the distance between the opposite side walls 37 of the aspirator.

At its rearward end, the container of the aspirator comprises an outlet slot or opening between plate 26 and bottom surface-skin 12 located at their respective and adjacent rearward edges 31 and 32, the outlet slot extending throughout the distance betwen opposite side walls 37. The several tail pipes 21 of units 20 comprise each an exhaust opening at its rearward end, between its side walls 22 and between top surface-skin 11 and plate 26 at their respective rearward edges 29 and 31, the exhaust openings of the several tail pipes 21 constituting the exhaust for all the engine of units 20.

As is seen best in Fig. 2, top skin 11 and plate 26 are approximately parallel to each other, and the path of the engine exhaust is determined thereby as it leaves the engine through the exhaust opening. Air flowing out of the aspirator is directed between the converging walls of plate 26 and bottom skin 12, in a path that intersects the engine exhaust rearwardly of the engine at an angle. A draft is produced by the engine exhaust, which operates to draw air through the outlet of the aspirator into the products of combustion after they leave the engine, to improve the process of combustion. The draft of the engine exhaust also operates to increase the rate of flow of air through the aspirator.

As observed in Fig. 2, the aspirator constitutes a duct, the cross-sectional area of which varies progressively along its length in the direction of fluid flow. Contour of plate 35 determines the degree of variation of cross-sectional areas at different points along the duct, and thereby determines the rate of air flow through the aspirator. Air is drawn into the aspirator through the inlet slot at forward edge 30 by the draft that the engine exhaust produces at the outlet between rearward edges 31 and 32 of plate 26 and bottom surface-skin 12, respectively.

The inlet slot of the aspirator at edge 30, and also the engine intake slot at edge 28, are in the top surface-skin 11 located rearwardly from the leading edge 16, the engine intake being located rearwardly from the aspirator inlet.

Air drawn into the aspirator through its inlet slot at edge 30 operates to induce air flow along the top surface of the wing, and the lift is improved thereby. Again, and along a spanwise line rearwardly of the aspirator inlet slot at 30, air flow is induced along the top surface of the wing by the engine intake at edge 28. The desired velocity of air intake to the engine of units 20 is determined by the degree of restriction of the intake slot at 28, plate 33 being contoured accordingly. Similarly, the desired velocity of air entering the aspirator through the inlet slot at edge 30 is determined by the degree of restriction of the inlet slot, which is established by the contour of plate 35, which also determines the gradiant of cross-sectional area along the duct of the aspirator.

The engine of units 20 positioned against the inside surface of top skin 11 is contained in the aspirator. The air that flows through the aspirator operates as a coolant for the engine, and inhibits deterioration of the engine material from the high temperature of combustion that prevails.

The several adjacent rearward edges 29, 31 and 32, respectively of top surface-skin 11, plate 26, and bottom surface-skin 12, are located forwardly of the line of trailing edge 17, and extend spanwise generally parallel therewith. Deflector flap 40 is provided, which pivots at 41 on trunnions or the like for deflection alternatively downwardly and upwardly, in a manner similar to conventional landing flaps. Preferably the spanwise extent of the engine units 20 is limited within the span of the conventional landing flap, which is replaced by deflector flap 40 of the present invention. Flap 40 performs the function of the conventional landing flap.

Flap 40 performs the additional function of directing the flow of the engine exhaust, and is adjustably positionable to deflect the exhaust more or less downwardly. Flap 40 constitutes a movable plate, the spanwise forward edge 42 of which is located at or near the axis of pivots 41, and adjacent to the rearward edges 29, 31 and 32, respectively of skin 11, plate 26 and bottom skin 12. From its forward edge 42, the plate of flap 40 extends rearwardly to its spanwise rearward edge 43, which is located to coincide with the line of trailing edge 17. The plate of flap 40 follows the contour of the top surface of the wing as defined by top skin 11, with the forward edge 42 being positioned slightly below the surface contour. The exhaust from the engine of units 20 is cleaved by forward edge 41 of plate 40, and a predetermined portion thereof is deflected thereby to travel over the top surface of the flap 40. Thus, at a third spanwise line rearwardly of the aspirator inlet at 30 and the engine intake at 28, air is induced to flow along the top surface of the wing at the rearward edge 29 of top surface-skin 11, to thereby increase the lift. Accordingly, the wing structure of the present invention improves boundary layer control, and the structure also enables thin-wing cross-section, which inhibits drag.

All of the exhaust from the engine, except the limited portion thereof that passes over the top surface of flap 40, flows along the under-surface of the flap. By being adjustable upwardly and downwardly, the plate of flap 40 operates to control the resistance to forward flight, not only by intercepting air flow along the surfaces of the wing, but also by adjustably deflecting the flow of exhaust more or less downwardly to control the jet thrust of the engine, and thereby improve the ability of the airplane to hover.

Obviously many modifications and variations of the present invention are possible in the light of the above teachings. It is therefore to be understood that within the scope of the appended claims the invention may be practiced otherwise than as specifically described.

I claim:

1. In aircraft wing structure comprising top and bottom surface skins, a set of pulse-jet units positioned side-by-side inside the wing spanwise thereof and positioned along the inside of the skin of the top surface, the top surface skin comprising an intake communicating from exteriorly of the wing with the several jet units and extending spanwise of the wing in position rearwardly of the leading edge, the wing structure comprising an exhaust communicating from the several jet units to the exterior of the wing and extending spanwise of the wing positioned along the trailing edge thereof, a flap hinged at the trailing edge and extending coextensively with the exhaust of the jet units, the flap being positioned in the path of fluid flow from the exhaust and located for a major portion of the flow to be deflected below the flap with the lesser remaining portion passing over the flap.

2. In wing structure as defined in claim 1, an aspirator constituting a cavity inside the wing structure adjacent to and below the set of jet units, the top surface skin comprising an air inlet communicating from exteriorly of the wing with the aspirator cavity and constituting a restricted slot extending spanwise of the wing in position rearwardly of the leading edge and forwardly of the jet intake, the wing structure comprising an outlet communicating from the aspirator cavity with the exterior of the wing, the aspirator outlet extending spanwise of the wing along the trailing edge between the bottom surface skin and the jet units adjacent to the jet exhaust, the aspirator being contoured and positioned with reference to the jet units to direct its fluid flow from its outlet along a path intersecting the path of fluid flow from the jet exhaust at a predetermined angle.

References Cited in the file of this patent

UNITED STATES PATENTS

| | | |
|---|---|---|
| 2,514,513 | Price | July 11, 1950 |
| 2,675,196 | Marnay | Apr. 13, 1954 |

FOREIGN PATENTS

| | | |
|---|---|---|
| 1,122,609 | France | May 28, 1956 |